United States Patent [19]

Lee

[11] 4,081,787

[45] Mar. 28, 1978

[54] PRIORITIED PHOTO-ISOLATED DIGITAL DATA TRANSMISSION SYSTEM

[75] Inventor: Thomas W. Lee, Cupertino, Calif.

[73] Assignee: The United States of America as represented by the Secretary of the Navy, Washington, D.C.

[21] Appl. No.: 755,119

[22] Filed: Dec. 27, 1976

[51] Int. Cl.² .................................... H03K 17/00
[52] U.S. Cl. ........................... 340/147 R; 340/172; 340/147 LP; 343/225; 343/228
[58] Field of Search ............ 340/147 R, 172, 147 LP; 343/225, 228; 250/199; 307/252 L

[56] References Cited

U.S. PATENT DOCUMENTS 3,808,366   4/1974   Wanamaker ................ 340/147 R

*Primary Examiner*—Harold I. Pitts
*Attorney, Agent, or Firm*—R. S. Sciascia; Charles D. B. Curry; Francis I. Gray

[57] ABSTRACT

A transmission system in which digital data from a transmitter is received by one of a plurality of photo-isolated receiver stages according to a predetermined sequence. The receiver stage having the least number of diode voltage drops receives the transmitted data, with the removal of the receiver stage with the least number of diode voltage drops causing reception by the receiver stage having the next least number of diode voltage drops.

6 Claims, 3 Drawing Figures

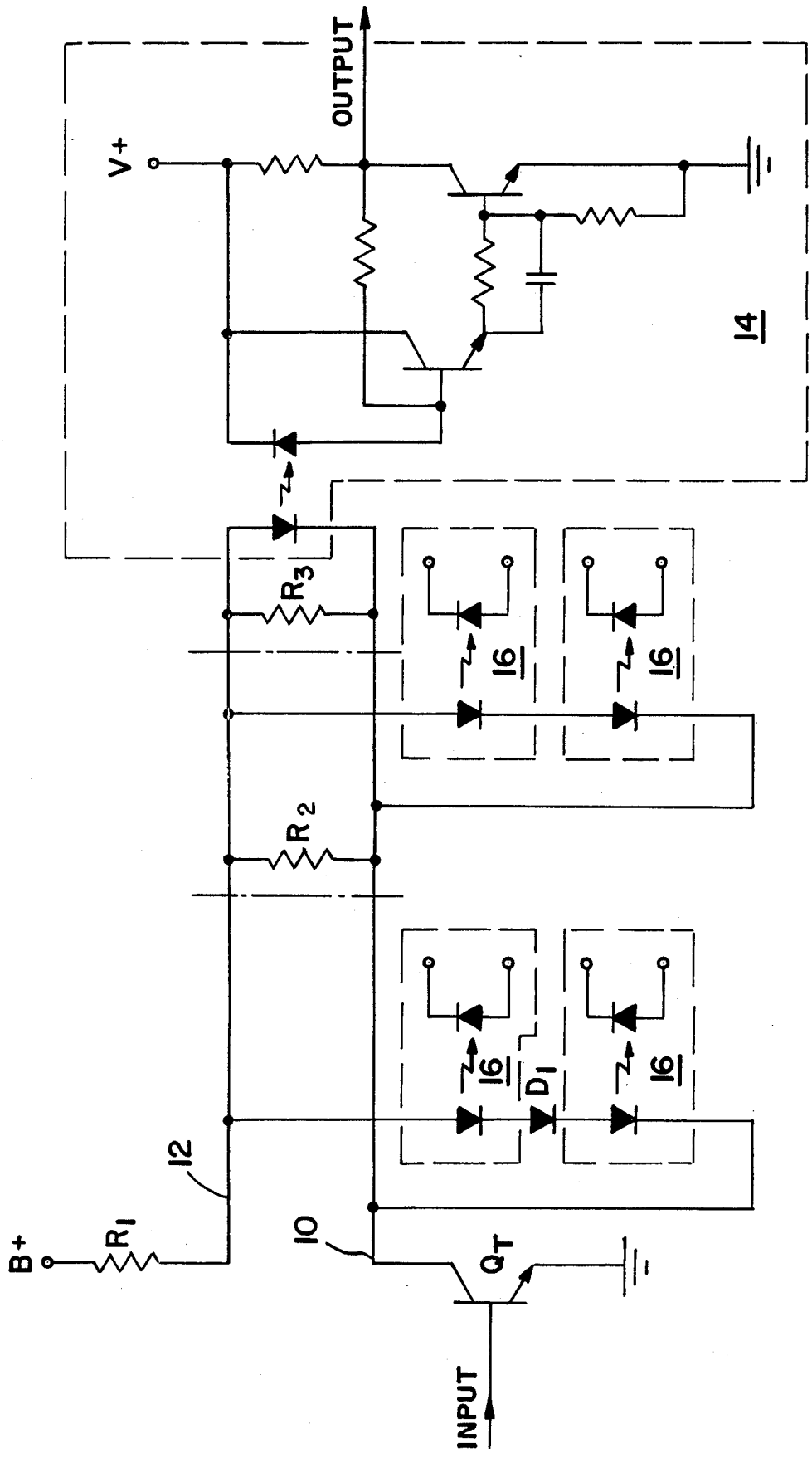
FIG_1

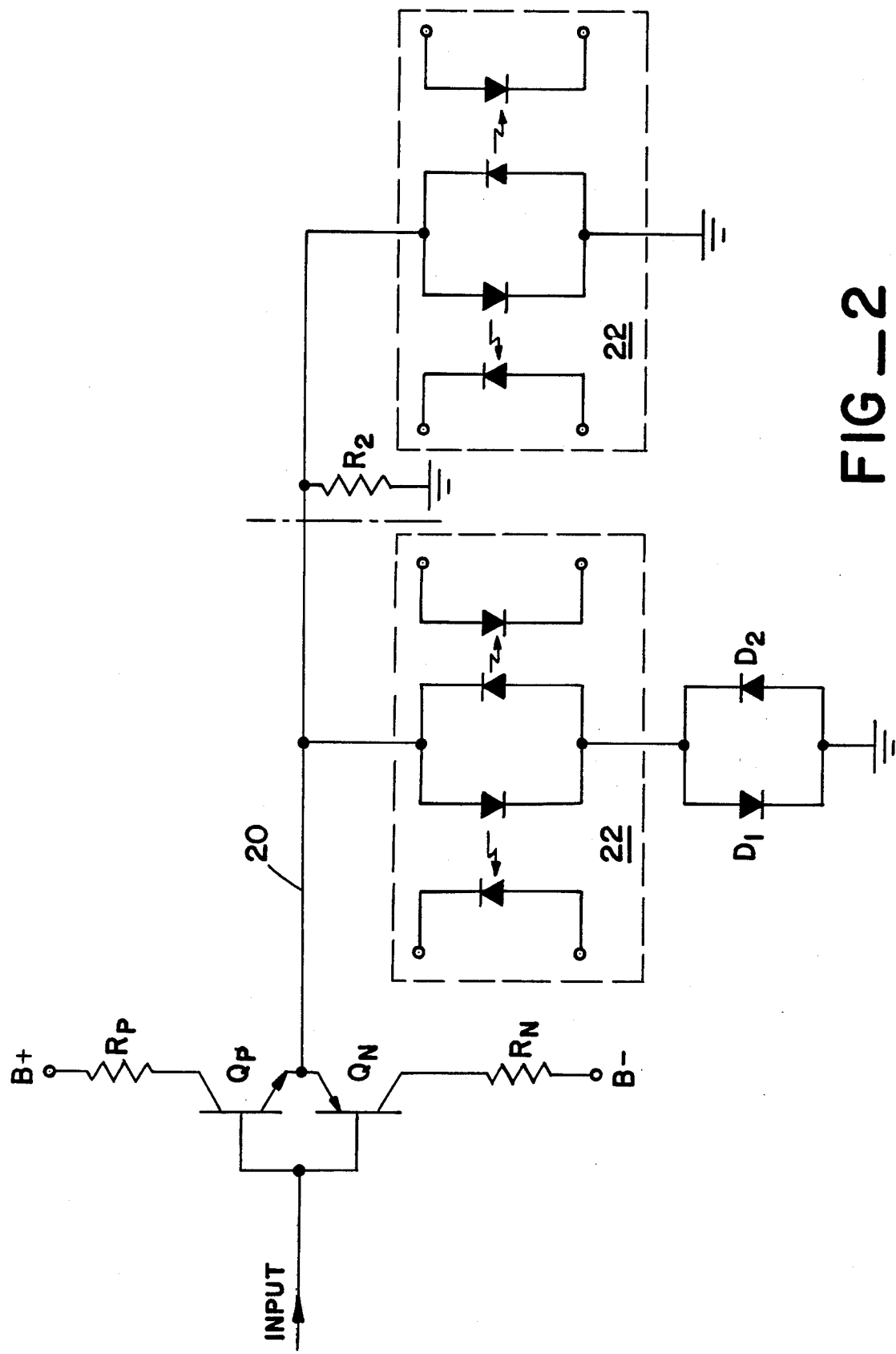
FIG_2

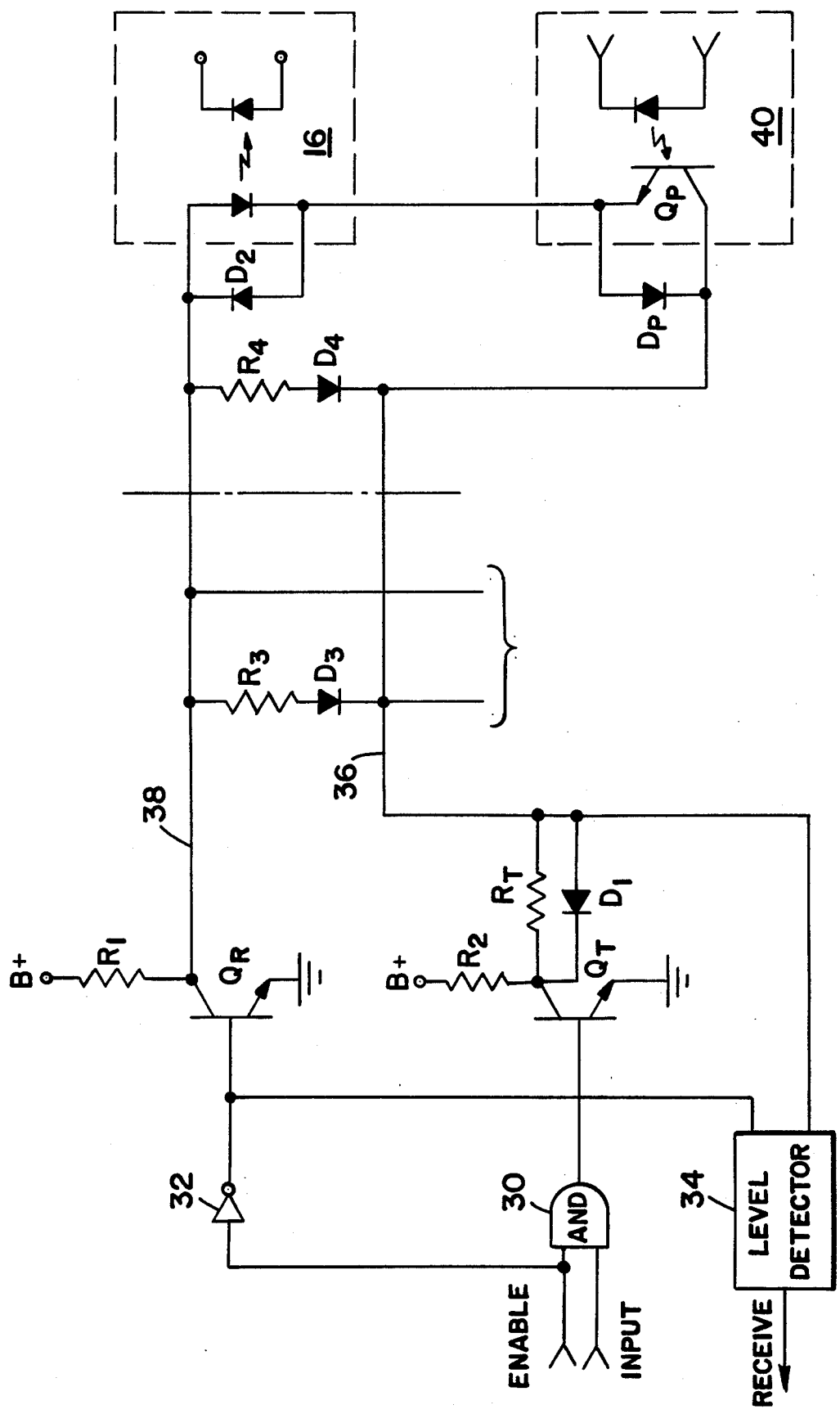
FIG_3

PRIORITIED PHOTO-ISOLATED DIGITAL DATA TRANSMISSION SYSTEM

BACKGROUND OF THE INVENTION

1. Field of the Invention

The present invention relates to a transmission system, and more particularly to a transmission system having a single transmitter and a plurality of receiver stages.

2. Description of the Prior Art

In aerospace applications, especially in multi-stage rockets or missiles, it is desired to transmit data to one section or stage at a time of an aerospace vehicle over a common data bus. In order for each section or stage to receive data, the data include bits which indicate the particular section or stage which is to receive the data. Thus, each section or stage has its own data decoder to detect that digital data intended for it, based on the configuration of the specified address bits in the data. This adds to the weight, complexity and cost of the aerospace vehicle, reducing the payload capability and increasing the possibility of a failure.

SUMMARY OF THE INVENTION

Accordingly, the present invention provides a transmitter which transmits data via a data bus to a plurality of receiver stages which are in parallel to each other. Each receiver stage has one or more receiver circuits in series which are photo-isolated from the data bus and have one or more series diode voltage drops, such that the receiver stage with the fewest such voltage drops, or lowest total voltage drop, receives the data. The receiver stages are removed from the data bus so that the receiver stage for which the data is intended has the lowest total voltage drop of the receiver stages connected to the data bus.

The receiver stages may be sequentially disconnected from the data bus in order of increasing total voltage drop and then discarded, such as when a stage of a multi-stage rocket or missile is discarded during staging. The data may be either uni-polar or bi-polar in format. For two-way transmission the receiver stages may also act as transmitters, with the transmitter acting as a receiver.

STATEMENTS OF THE OBJECTS OF THE INVENTION

It is therefore an object of the present invention to provide a photo-isolated prioritied digital data transmission system.

Another object of the present invention is to provide a digital data transmission system wherein each receiver stage is accessed without the use of a data decoder.

Still another object of the present invention is to provide a digital data transmission system wherein each receiver stage is accessed in a predetermined sequence.

A further object of the present invention is to provide a digital data transmission system for two-way transmission.

Yet another object of the present invention is to provide a digital data transmission system for either uni-polar or bi-polar digital data.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic diagram of one embodiment of a digital data transmission system according to the present invention.

FIG. 2 is a schematic diagram of a bi-polar embodiment of a digital data transmission system according to the present invention.

FIG. 3 is a schematic diagram of another embodiment of the present invention for two-way transmission.

DESCRIPTION OF THE PREFERRED EMBODIMENT

Referring now to FIG. 1 a transmitter, such as transistor $Q_t$ in the common-emitter configuration (NPN shown), has a uni-polar digital data input. The positive pulses cause the transmitter $Q_t$ to saturate, essentially placing line 10 at ground potential. The current path is thus from ground through the transmitter $Q_t$, through one of the parallel diode paths in parallel with the current limiting resistances $R_2$ and $R_3$, through the load resistor R, to the voltage source B+. The parallel diode paths, three in number for illustration purposes only, are separated by the heavy dashed lines. Each receiver circuit, a typical circuit 14 being illustrated as an emitter-follower/common-emitter circuit with negative feedback, is photo-isolated from the transmitter $Q_t$ by light-emitting diode/photodiode pairs 16. The parallel diode path, or stage, which has the fewest diode voltage drops will conduct and complete the current path to the source.

For example, if the voltage drop across a diode is 0.5 volts when the diode is conducting, as soon as a positive pulse causes line 10 to go to ground potential the source voltage will be impressed across each parallel diode path. The parallel path with the fewest diodes, such as receiver 14, will conduct resulting in a 0.5 voltage differential between lines 10 and 12. For those paths with more than one diode, 1.0 volt or more between lines 10 and 12 is required for them to conduct, therefore, they are cut-off. If the stage with only one diode in the path is removed, either by a suitable switching device or by physical separation as in the staging of a multi-stage rocket, the stage with two diodes will not conduct and the stages with more than two diodes will still be cut-off.

Additional diodes $D_1$ can be used to provide the necessary diode voltage drops so that the various stages will be accessed in a predetermined sequence as each stage with the fewest diodes is disconnected from lines 10 and 12. In a multi-stage missile application the first stage would have the fewest diode drops, the second stage a larger number of diode drops and the third stage the greatest number of diode drops so that at each staging the data transmitted by the transmitter $Q_t$ will automatically be switched from the first stage to the second stage to the third stage at each staging event.

FIG. 2 shows a bi-polar configuration where the digital data is in the form of both positive and negative pulses. During positive pulses transistor $Q_p$ conducts and the current flow is from ground potential through the parallel path with the fewest diode drops, through transistor $Q_p$, through load resistor $R_p$ to the source B+. The photo-isolation consists of two light-emitting diode/photodiode combinations 22 connected in parallel but in opposite polarities such that the left-hand LED conducts for positive pulses.

For a negative pulse transistor $Q_n$ conducts and transistor $Q_p$ is cut-off. Current flow is from the negative source B−, through load resistor $R_n$, transistor $Q_n$, and the right-hand LED in the path with the fewest diode drops to ground. Again, current limiting resistor $R_2$ may be used, as well as parallel opposite polarity additional diodes $D_1$ and $D_2$ to provide the necessary diode drops for each stage.

Finally, two-way transmission can be achieved as shown in FIG. 3. For transmission AND gate 30 is enabled so that input digital data, uni-polar data for the circuit illustrated, is applied to the base of transmitting transistor $Q_t$. The enable signal is also applied to inverter 32 to cut-off transistor $Q_r$ and disable detector 34. The conduction of transistor $Q_t$ places line 36 at essentially ground potential and the cut-off of transistor $Q_r$ places line 38 at a positive voltage equal to the voltage drop across the parallel path with the fewest diode drops. The current flows from ground through transistor $Q_t$ and load resistor $R_2$ to B+; and through diode $D_1$, which essentially shorts out resistor $R_t$ to line 36, through $D_3 R_3$ and $D_4 R_4$ parallel diode-resistor pair current limiting paths which are in parallel with bypass diode $D_p$ and receiver 16 LED, and through load resistor $R_1$ to B+.

For reception a remote transmitter 40 has a phototransistor $Q_p$ driven by a light-emitting diode, $Q_p$ being bypassed by $D_p$ during normal transmission/reception as described above. The ENABLE signal is removed which (1) cuts-off transistor $Q_t$, (2) causes transistor $Q_r$ to conduct via the inverter 32, and (3) enables the level detector 34 via the inverter. This action places line 38 essentially at ground voltage and line 36 at essentially B+. Since diodes $D_3$ and $D_4$, receiver 16 LED, bypass diode $D_p$ and diode $D_1$ are reverse biased, the action of photo-transistor $Q_p$ controls the voltage on line 36. When photo-transistor $Q_p$ does not conduct, it acts as an open circuit and line 36 is at B+ as indicated. When photo-transistor $Q_p$ does conduct, it acts as a short circuit allowing current to flow from ground through transistor $Q_r$ and load resistor $R_1$ to B+, and through transistor $Q_n$, receiver bypass diode $D_2$, photo-transistor $Q_p$, resistor $R_t$ and load resistor $R_2$ to B+. The voltage detected at level detector 34 depends upon the number of diode drops in the current path, which in turn depends upon which stage has the fewest diode drops. Therefore, the output of level detector 34 not only provides the data, but the level of output indicates automatically from which stage the data is being transmitted.

If switching speed is not important as opposed to amplification, the LED/photodiode pairs 16 can be replaced with LED/phototransistor pairs, reducing the amplification required by the following receiver circuit, such as circuit 14.

Thus, the present invention provides a transmission system that automatically transmits to the desired receiver stage without the use of digital data decoders, and automatically switches to the next stage in a predetermined sequence as the stages are disconnected.

What is claimed is:
1. A digital data transmission system comprising:
 (a) means for transmitting digital data;
 (b) means for distributing said digital data from said transmitting means;
 (c) a plurality of receiver stages connected in parallel to said distributing means, each of said receiver stages having a receiver circuit which is photo-isolated from said distributing means and having a unique total voltage potential drop; and
 (d) means for disconnecting each of said receiver stages from said distributing means;
 (e) whereby only said receiver stage having the smallest total voltage potential drop which is connected to said distributing means receives said digital data.
2. A digital data transmission system as recited in claim 1 further comprising:
 (a) means located in each of said receiver stages for sending digital data to said transmitting means via said distributing means; and
 (b) means located at said transmitting means for receiving digital data from said sending means via said distributing means;
3. A digital data transmission system as recited in claim 2 further comprising means located at said transmitting means for determining from which sending means the digital data is being received.
4. A digital data transmission system as recited in claim 3 wherein said total voltage potential drop of each of said receiver stages comprises a function of the number of equivalent diodes in series.
5. A digital data transmission system as recited in claim 4 wherein the photo-isolation of said receiver circuit comprises a light-emitting diode (LED)/photodiode pair, the LED being connected in a line to said distributing means and the photodiode being connected to the input of said receiving circuit.
6. A digital data transmission system as recited in claim 4 wherein the photo-isolation of said receiver circuit comprises a light-emitting diode (LED)/phototransistor pair, the LED being connected in a line to said distributing means and the phototransistor being connected to the input of said receiving circuit.

* * * * *